United States Patent [19]
Boella et al.

[11] Patent Number: 5,132,605
[45] Date of Patent: Jul. 21, 1992

[54] SYSTEM FOR RECHARGING THE BATTERY OF A MOTOR VEHICLE

[75] Inventors: Marcello Boella, Ivrea; Roberto Vercesi, Turin, both of Italy

[73] Assignee: Marelli Autronica SpA, Milan, Italy

[21] Appl. No.: 673,546

[22] Filed: Mar. 22, 1991

[30] Foreign Application Priority Data

Mar. 22, 1990 [IT] Italy .................. 67211 A/90

[51] Int. Cl.$^5$ ............................................. H02D 7/14
[52] U.S. Cl. ............................................. 322/99; 320/64
[58] Field of Search ............... 322/28, 99; 320/61, 320/64, 68

[56] References Cited

U.S. PATENT DOCUMENTS

| 4,361,796 | 11/1982 | Akita et al. | 322/99 |
| 4,665,354 | 5/1987 | Sada et al. | 320/64 |

FOREIGN PATENT DOCUMENTS 2164508 of 1984 United Kingdom.

Primary Examiner—Steven L. Stephan
Assistant Examiner—Kristine Peckman
Attorney, Agent, or Firm—Sughrue, Mion, Zinn Macpeak & Seas

[57] ABSTRACT

A system for recharging a battery includes a current generator, a switch operable by a key and connected to the battery, an indicator lamp connected in series with the switch, and a voltage regulator with first and second inputs connected to the output of the generator and to the lamp, respectively. The regulator includes a circuit for regulating the current supplied to the field winding of the alternator in dependence on the voltage supplied by the generator, a supply circuit for supplying the voltage regulator circuit, and control circuit for enabling the supply circuit to operate when a current is flowing in the lamp and when the generator is in operation. The control circuit includes a comparator connected to the second input of the regulator, and hence to the lamp, and adapted to supply an enabling signal to the supply circuit when the voltage at the second terminal exceeds a predetermined threshold.

3 Claims, 1 Drawing Sheet

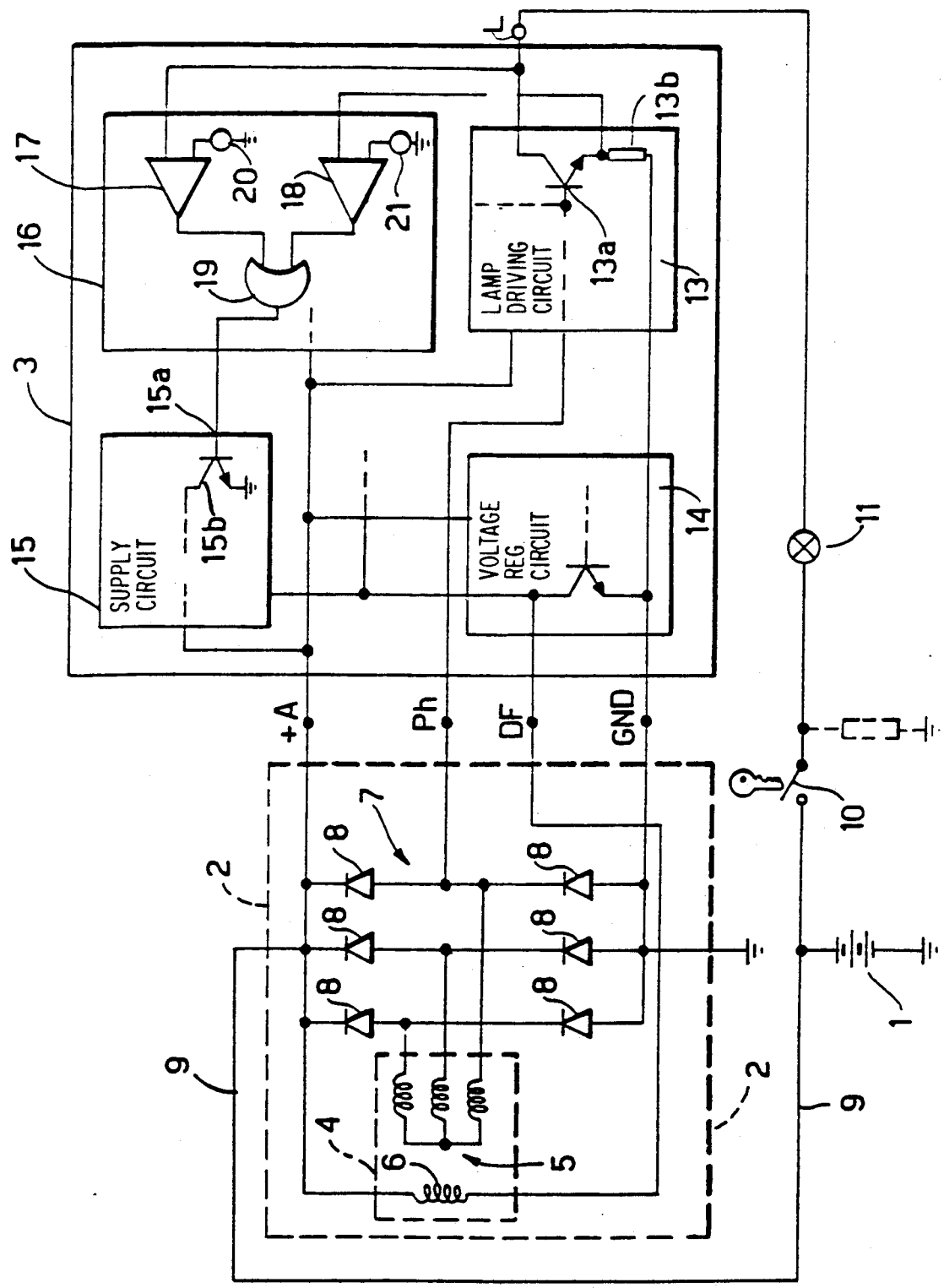

5,132,605

SYSTEM FOR RECHARGING THE BATTERY OF A MOTOR VEHICLE

BACKGROUND OF THE INVENTION

The present invention relates to a system for recharging the battery of a motor vehicle.

More specifically, the invention relates to a system including:

a current generator including an alternator with an armature winding and a field winding, and a rectifier, the output of the generator being connected to a terminal of the battery, a switch connected to the said terminal of the battery,
an indicator lamp connected in series with the switch, and a voltage regulator which has first and second inputs connected to the output of the generator and to the lamp respectively, and which is activated through the switch and the lamp, the regulator including:

a circuit for regulating the current supplied to the field winding of the alternator in dependence on the voltage, supplied by the generator, a driver circuit for the lamp, adapted to turn on the lamp when the switch is closed and the generator is not operating and to turn off the lamp when the switch is open, and when the generator is operating whilst while the switch is closed, a supply circuit for supplying the voltage regulator circuit, and control circuitry connected to the lamp for enabling the supply circuit to operate when a current is flowing in the lamp and when the generator is operating.

A battery-charging system for a motor vehicle of the type specified is described, for example, in British patent application No. 2,164,508.

In this known recharging system, when the key-operated switch is closed, the voltage regulator is supplied through the indicator lamp. When the alternator is subsequently set in operation (as a result of the starting of the internal combustion engine of the vehicle), the flow of current through the lamp is interrupted and the lamp goes out. The voltage regulator is nevertheless supplied through a control circuit connected to one winding or phase of the alternator. When the alternator is rotated, an asymmetrical alternating signal is applied to the input of the control circuit. The control circuit includes an R-C mean-value detector. As soon as the mean value of the signal taken from one phase of the alternator exceeds a predetermined minimum threshold, the control circuit enables the supply circuit to supply the voltage regulator.

In the prior-art system described above, if there is a leakage of current through one or more diodes of the rectifier bridge of the generator, a direct current may reach the control circuit and, in particular, the capacitor of the mean-value detector of that circuit. This direct current can simulate the phase signal when the alternator is not operating and may result in the undesired activation of the supply circuit even when the key-operated switch is open. Inappropriate activation of the voltage-regulator supply circuit results in the detrimental consumption of energy from the battery.

SUMMARY OF THE INVENTION

The object of the present invention is to provide a recharging system of the aforesaid type in which, when the alternator starts, the regulator supply circuit is enabled independently of the phase signal taken from one winding of the alternator.

According to the invention, this object is achieved by means of a system of the type specified above, whose main characteristic lies in the fact that the control circuitry includes first comparator means connected to the second terminal of the voltage regulator, and hence to the lamp, and adapted to supply an activation signal to the supply circuit when the voltage at the second terminal of the regulator exceeds a predetermined threshold.

BRIEF DESCRIPTION OF THE DRAWINGS

Further characteristics and advantages of the invention will become clear from the detailed description which follows with reference to the appended drawing which is a diagram of a system according to the invention.

DETAILED DESCRIPTION OF THE INVENTION

With reference to the drawing, in order to recharge the battery 1 of a motor vehicle, a system according to the invention includes a current generator 2 and a voltage regulator, generally indicated 3, preferably in the form of an integrated circuit.

The generator 2 comprises, in known manner, an alternator 4 with a three-phase armature winding 5 (connected in a star arrangement in the embodiment shown by way of example) and a field winding 6. The armature winding 5 of the alternator is connected to a three-phase full-wave rectifier 7 formed with semiconductor diodes 8; the output of the rectifier 7, which constitutes the output of the generator 2 as a whole, is connected to a pole of the battery 1 by means of a connecting cable.

A switch, indicated 10, is connected to the positive pole of the battery 1. The switch is operable manually, for example, by means of a key and may be incorporated, for example, in the ignition and starter switch of the motor vehicle. One terminal of an indicator lamp 11 is connected to the switch 10 and its other terminal is connected to an input L of the voltage regulator 3. The switch 10 and the lamp 11 are thus connected in series between the battery 1 and the input L of the regulator 3. Moreover, in operation, as will become clearer from the following, the regulator 3 is activated via the path by which the switch 10 and the lamp 11 are connected in series.

In known manner, the is intended to be turned on (lit) when the switch 10 is closed and no current is supplied by the generator 2.

The regulator 3 has a further four terminals, indicated A, Ph, DF and GND respectively.

The terminal A is connected to the output of the generator 2.

The terminal Ph is connected to one phase of the armature winding 5 of the alternator 4.

The terminal DF is connected to one end of the field winding 6, the other end of which is connected to the output of the generator 2.

Finally, the terminal GND is connected to the earthed terminal of the rectifier circuit 7.

The regulator 3 also includes (again in known manner) a voltage-regulator circuit 14 with an input connected to the terminal A and an output connected to the terminal DF and hence to the field winding of the alternator. In known manner, the circuit 14 regulates the current supplied to the winding 6 in operation, in a predetermined manner in dependence on the value of the voltage supplied by the generator 2.

The regulator 3 also includes (again in known manner) a driver circuit 13 for the lamp 11. The input of the driver circuit is connected to the terminal Ph and hence to one phase of the alternator 4. The driver circuit also includes an output transistor 13a whose collector-emitter path is connected between the terminal L of the regulator and earth.

In operation, when the switch 10 is closed and the alternator 4 is not operating, the transistor 13a is made conductive in known manner and the lamp 11 is lit.

As soon as the alternator 4 is activated and the signal at the input Ph of the regulator exceeds the threshold of a comparator circuit within the circuit 13, the transistor 13a is made non-conductive and the lamp 11 consequently goes out.

The integrated regulator 3 also includes a supply circuit 15 for supplying the voltage-regulator circuit 14 and for supplying reference voltages with pre-established values to other circuits of the regulator 3. The supply circuit has an input connected to the terminal A and an enabling input, indicated 15a. The latter is connected to the output of a control circuit, generally indicated 16.

The control circuit 16 includes two comparators 17 and 18 whose outputs are connected to the inputs of an OR circuit, indicated 19. The output of that circuit is connected to the enabling input 15a of the supply circuit and hence to the base of an input transistor 15b of that circuit.

One input of the comparator 17 is connected to the terminal L, and hence to the lamp 11, and its other input is connected to a reference voltage supply, indicated 20.

In the embodiment shown by way of example, a resistor 13b is interposed between the emitter of the transistor 13a of the driver circuit 13 and earth. In operation, a potential difference or voltage is developed between the terminals of this resistor and is indicative of the intensity of the current flowing in the lamp 11.

The comparator 18 has one input connected to the non-earthed terminal of the resistor 13b and another input connected to a reference voltage supply 21.

The comparators 17 and 18 are arranged to output "high" level signals when the signals at their inputs exceed the levels of their respective reference signals.

The control circuit 16 described above operates as follows.

When the switch 10 is open, the outputs of both the comparators 17 and 18 are at "low" levels and the input transistor 15b of the supply circuit 15 is non-conductive. The supply circuit is therefore deactivated.

When the switch 10 is closed, a current flows through the lamp 11. As soon as the current exceeds a pre-established minimum threshold, the output of the comparator 18 changes to a "high" level, making the input transistor 15b of the supply circuit 15 conductive. The circuit is activated and supplies the necessary polarising voltages to the voltage regulator circuit 14 and the necessary reference voltages to other devices of the regulator 3. When the motor-vehicle engine is started and the generator 2 starts to supply a current, the circuit 13 switches off the lamp 11. The voltage across the resistor 13b falls below the level of the reference voltage associated with the comparator 18 whose output changes to a "low" level. When the lamp 11 goes out, however, the voltage between the terminal L of the regulator 3 and earth rises and, in particular, is brought to the battery voltage (less the voltage drops in the switch 10 and the lamp 11). Thus, whilst the output of the comparator 18 changes to the "low" level, the output of the comparator 17 is brought to a "high" level, keeping the supply circuit 15 enabled.

When the engine of the motor vehicle is started, the supply circuit 15 is thus kept operative independently of the processing of the phase signal so as to avoid the problem described above with reference to prior-art systems.

Naturally, the principle of the invention remaining the same, the forms of embodiment and details of construction may be varied widely with respect to those described and illustrated purely by way of non-limiting example, without thereby departing from the scope of the present invention.

What is claimed is:

1. A system for recharging a battery of a motor vehicle, including:
    a current generator including an alternator with an armature winding and a field winding, and a rectifier, the output of the generator being connected to a terminal of the battery,
    a switch connected to said terminal of the battery,
    an indicator lamp connected in series with the switch, and
    a voltage regulator which has first and second inputs connected to the output of the generator and to the lamp respectively, and which is activated through the switch and the lamp, the regulator including
    a circuit for regulating a current supplied to the field winding of the alternator in dependence on the voltage supplied by the generator,
    a supply circuit for supplying the voltage regulator, and
    control circuitry connected to the lamp for enabling the supply circuit to operate when the lamp is on and when the generator is operating;
    the control circuitry including first comparator means connected to the second input of the voltage regulator, and hence to the lamp, and supplying a first enabling signal to the supply circuit when the voltage at the second input exceeds a first predetermined threshold.

2. A system according to claim 1, wherein the control circuitry also includes:
    sensor means for supplying an electrical signal indicative of the intensity of current flowing in the lamp, and
    second comparator means connected to the sensor means and supplying a second enabling signal to the supply circuit when the intensity of the current in the lamp exceeds a second predetermined threshold.

3. A system according to claim 2, wherein the outputs of the first and second comparator means are connected to an activating input of the supply circuit through an OR circuit.

* * * * *